US012274981B2

(12) United States Patent
Menkhaus et al.

(10) Patent No.: US 12,274,981 B2
(45) Date of Patent: Apr. 15, 2025

(54) MEMBRANE CAPSULE

(71) Applicant: NANOPAREIL, LLC, Dakota Dunes, SD (US)

(72) Inventors: Todd J. Menkhaus, Dakota Dunes, SD (US); D. Craig Arnold, Dakota Dunes, SD (US); Steven Schneiderman, Dakota Dunes, SD (US)

(73) Assignee: NANOPAREIL, LLC, Comberton (GB)

( * ) Notice: Subject to any disclaimer, the term of this patent is extended or adjusted under 35 U.S.C. 154(b) by 844 days.

(21) Appl. No.: 17/250,490

(22) PCT Filed: Jul. 29, 2019

(86) PCT No.: PCT/US2019/043847
§ 371 (c)(1),
(2) Date: Jan. 27, 2021

(87) PCT Pub. No.: WO2020/023952
PCT Pub. Date: Jan. 30, 2020

(65) Prior Publication Data
US 2022/0040641 A1 Feb. 10, 2022

Related U.S. Application Data

(60) Provisional application No. 62/711,160, filed on Jul. 27, 2018.

(51) Int. Cl.
*B01D 61/18* (2006.01)
*B01D 53/22* (2006.01)
(Continued)

(52) U.S. Cl.
CPC ........... *B01D 61/18* (2013.01); *B01D 53/228* (2013.01); *B01D 63/12* (2013.01); *B01D 63/14* (2013.01);
(Continued)

(58) Field of Classification Search
CPC ...... B01D 61/18; B01D 53/228; B01D 63/12; B01D 63/14; B01D 2053/223;
(Continued)

(56) References Cited

U.S. PATENT DOCUMENTS 3,246,449 A 4/1966 Stern et al.
4,083,780 A 4/1978 Call
(Continued)

FOREIGN PATENT DOCUMENTS

EP 0130418 A2 1/1985
EP 0141201 A1 5/1985
(Continued)

OTHER PUBLICATIONS

Menkhaus, et al, "Applications of Electrospun Nanofiber Membranes for Bioseparations", Handbook of Membrane Research, Chapter 3, Nova Science Publishers, Inc., ISBN: 978-1-60741-638-8, 2009.
(Continued)

*Primary Examiner* — Pranav N Patel
(74) *Attorney, Agent, or Firm* — McKee, Voorhees & Sease, PLC

(57) ABSTRACT

A membrane capsule for biological and chemical separations comprising a cassette comprising an upper surface and a lower surface adjoined by a cassette sidewall, an inlet and an outlet located on the upper and lower surfaces of the cassette, tubes fluidly connected to the inlet and the outlet, holes or slots in the tubes to facilitate separation, and a membrane wrapped, pleated, and/or spiral wound around each of the tubes. Methods of separation comprising flowing fluid flow through the inlet of the membrane capsule, allowing the fluid to permeate through the holes or slots of
(Continued)

the tubes, separating biological and/or non-biological substances, collecting the fluid within a reservoir, and draining fluid from the reservoir.

24 Claims, 12 Drawing Sheets

(51) Int. Cl.
*B01D 63/12* (2006.01)
*B01D 63/14* (2006.01)

(52) U.S. Cl.
CPC .. *B01D 2053/223* (2013.01); *B01D 2201/291* (2013.01); *B01D 2257/91* (2013.01); *B01D 2313/105* (2013.01); *B01D 2313/125* (2013.01); *B01D 2313/44* (2013.01); *B01D 2313/54* (2013.01); *B01D 2319/02* (2013.01); *B01D 2319/04* (2013.01)

(58) Field of Classification Search
CPC ......... B01D 2201/291; B01D 2257/91; B01D 2313/105; B01D 2313/125; B01D 2313/44; B01D 2313/54; B01D 2319/02; B01D 2319/04; B01D 39/1623; B01D 63/107; B01D 2239/0216; B01D 2239/0414; B01D 2239/0428; B01D 39/18; B01D 2239/025; B01D 2239/0442; B01D 2239/0631; B01D 2239/1216; B01D 2258/06; B01J 20/28038; B01J 47/12; B01J 2220/62; G01N 30/6069
See application file for complete search history.

(56) References Cited

U.S. PATENT DOCUMENTS

| | | | |
|---|---|---|---|
| 4,104,170 A * | 8/1978 | Nedza | B01D 39/1623 55/498 |
| 4,517,085 A | 5/1985 | Driscoll et al. | |
| 4,909,937 A | 3/1990 | Hoffman et al. | |
| 5,108,604 A | 4/1992 | Robbins | |
| 5,897,779 A | 4/1999 | Wisted et al. | |
| 5,997,594 A | 12/1999 | Edlund et al. | |
| 6,270,674 B1 | 8/2001 | Baurmeister et al. | |
| 7,404,843 B2 | 7/2008 | Kaschemekat et al. | |
| 7,758,670 B2 | 7/2010 | Wynn et al. | |
| 9,604,168 B2 | 3/2017 | Menkhaus et al. | |
| 2003/0024868 A1* | 2/2003 | Hallan | B01D 63/106 210/321.74 |
| 2009/0200226 A1 | 8/2009 | Straeffer et al. | |
| 2011/0120936 A1* | 5/2011 | Escobar | B01D 65/08 428/34.1 |
| 2012/0006749 A1* | 1/2012 | Said | B01D 63/12 210/321.74 |
| 2012/0097597 A1* | 4/2012 | Billovits | B01D 65/003 210/321.83 |
| 2012/0261333 A1* | 10/2012 | Moran | B01D 63/10 210/500.23 |
| 2017/0100701 A1 | 4/2017 | Kim et al. | |
| 2017/0349626 A1 | 12/2017 | Ghosh | |
| 2019/0127678 A1* | 5/2019 | Bransby | C12M 29/04 |

FOREIGN PATENT DOCUMENTS

| | | |
|---|---|---|
| EP | 0529921 A1 | 3/1993 |
| EP | 0989904 A1 | 5/2000 |
| EP | 1679111 A2 | 7/2006 |
| GB | 2202164 A | 9/1988 |
| JP | 2016007573 A | 1/2016 |
| WO | 9835738 A1 | 8/1998 |
| WO | 9919456 A1 | 4/1999 |
| WO | 2017189977 A1 | 11/2017 |
| WO | 2018037244 A1 | 3/2018 |

OTHER PUBLICATIONS

Sun, et al, "Electrospun Composite Nanofiber Fabrics Containing Uniformly Dispersed Antimicrobial Agents as an Innovative Type of Polymeric Materials with Superior Antimicrobial Efficacy", Applied Materials & Interfaces, vol. 2, No. 4, pp. 952-956, 2010.

Zhang, et al, "Antimicrobial nano-fibrous membranes developed from electrospun polyacrylonitrile nanofibers", Journal of Membrane Science, vol. 369, pp. 499-505, 2011.

Nanopareil, LLC, PCT/US2019/043847 filed Jul. 29, 2019, "The Notification of Transmittal of the International Search Report and the Written Opinion of the International Searching Authority, or the Declaration", mailed Nov. 21, 2019.

* cited by examiner

MEMBRANE CAPSULE

CROSS REFERENCE TO RELATED APPLICATIONS

This is a U.S. National Phase application claiming priority to PCT/US2019/043847, filed Jul. 29, 2019, which claims priority under 35 U.S.C. § 119 to provisional application U.S. Ser. No. 62/711,160, filed Jul. 27, 2018, the entire contents of which are hereby incorporated by reference in their entirety.

STATEMENT REGARDING FEDERALLY SPONSORED RESEARCH OR DEVELOPMENT

This invention was made with government support under Grant Number IIP-1329377, awarded by the National Science Foundation, and was effective from Mar. 1, 2014 to Feb. 29, 2016. This award was amended to increase the funding and run until Feb. 28, 2017. The Government has certain rights in the invention.

TECHNICAL FIELD

The present invention relates generally to an apparatus for use in biological and chemical separations, as well as other applications. More particularly, but not exclusively, the present invention relates to a membrane capsule, which facilitates high-throughput, uniform fluid flow distribution in high-efficiency separation processes.

BACKGROUND

The biopharmaceutical therapeutics industry is expanding as more and more biopharmaceuticals are approved for sale. In addition, biologically based diagnostic tools are widely used to perform high throughput, sensitive diagnostic testing of various disease states. For both therapeutics and diagnostics, biological substances (e.g., recombinant proteins, monoclonal antibodies, viral vaccines, cells and nucleic acids) must be efficiently produced and purified for use.

Conventional purification methodologies are limited in terms of yield, processing time and degree of purity. These limitations are primarily due to slow diffusion rates of relatively large biomolecules, which limits the ability of the substance being purified (i.e., the "target substance") to access available binding sites deep within the separation matrix. In addition, these systems can be extremely large and require excessive amounts of separation media.

Ion-exchange (IE) and hydrophobic interaction (HI) adsorption chromatography are two examples of more robust conventional separation technologies that are widely used for separation of biological substances. They are generally less efficient overall than separation technologies based on specific affinity, such as antibody-based separations, but if separation conditions are carefully selected, they are still useful for purifying many target substances from undesirable byproducts and impurities.

While affinity-based adsorption chromatography may be more efficient than IE and HI, it is generally more difficult and expensive to manufacture, because of the complexity of producing and purifying biological ligands, such as monoclonal antibodies and nucleic acids. Such ligands are also often very sensitive to environmental conditions (e.g., temperature, pH, ionic strength, etc.) and can easily become deteriorated such that the affinity interaction required for adsorption is destroyed. In addition, the binding interaction is sometimes difficult to disrupt without harsh conditions that may lessen the biological activity and hence the usefulness of the target substance or the reusability of the purification media.

Membranes that are useful for purification of biological substances have been described. (See, e.g., Bioprocessing for Value-Added Products from Renewable Resources, Shang-Tian Yang, Ed., Chapter 7.) Recently, membrane adsorption chromatography using nanometer diameter fibers constructed into mats of controlled thickness (i.e., "nanofiber felts") has shown great promise for use in bioseparations (Todd J. Menkhaus, et al., "Chapter 3: Applications of Electrospun Nanofiber Membranes for Bioseparations", in Handbook of Membrane Research, Stephan V. Gorley, Ed.) Such nanofiber felts are superior to microfiber felts and modified phase inversion membranes, because pore sizes, available surface area, affinity characteristics, as well as other characteristics, can be more precisely controlled, which leads to dramatically improved performance.

While previously described single component nanofiber felts have provided promising results, they are often less efficient than would be desirable in terms of stability of the felts, as well as material and time requirements. This is particularly true when the target substance is only present in the starting material to be purified at a low concentration, and contaminants or the byproducts of synthesis are abundant. Thus, there exists a need to improve the stability of the felts and the purification efficiency of biological products.

Additionally, there exists a need in the art for a mechanical apparatus which complements recent developments made towards improving the stability of the felts and the purification efficiency of biological products, thereby improving the efficiency of such processes, especially, but not limited to, larger production scales.

BRIEF SUMMARY OF THE PREFERRED EMBODIMENTS

Therefore, it is a primary object, feature, or advantage of the technology disclosed herein to improve on or overcome the deficiencies in the art.

It is still yet a further object, feature, or advantage of the technology disclosed herein to provide an apparatus that is able to accommodate in increasing number of membrane cartridges such that the apparatus may be used in a wide variety of applications and a wide variety of production scales.

It is still yet a further object, feature, or advantage of the technology disclosed herein to an apparatus that is cost effective.

It is still yet a further object, feature, or advantage of the technology disclosed herein to provide an apparatus that is reliable and durable and has a long usable life.

It is still yet a further object, feature, or advantage of the technology disclosed herein to provide an apparatus that can be easily manufactured, installed, used, repaired, replaced, disassembled, stored, and cleaned. For example, the membrane capsule may be used in a single-use mode or a continuous-use mode.

It is still yet a further object, feature, or advantage of the technology disclosed herein to provide an apparatus that enhances the bio-safety of the people during use. For example, the technology disclosed herein is sanitized, entirely self-contained, and can be easily capped to protect the product and to avoid contamination.

It is still yet a further object, feature, or advantage of the technology disclosed herein to enhance quality control by providing only a single apparatus which accomplishes all of the stated objectives so that personnel are required to keep track of only one device.

It is still yet a further object, feature, or advantage of the technology disclosed herein to provide an apparatus that is aesthetically pleasing.

According to some aspects of the disclosure, a membrane capsule for biological and chemical separations comprises an upper surface and a lower surface adjoined by a cassette sidewall, an inlet and an outlet located on the upper and lower surfaces of the membrane capsule, tubes fluidly connected to the inlet and the outlet, and holes or slots in the tubes to facilitate separation.

According to additional aspects of the disclosure, the membrane capsule further comprises nanofibrous membranes wrapped, pleated, and/or spiral wound around the tubes.

According to additional aspects of the disclosure, the membrane capsule further comprises diversions near the inlet to facilitate even fluid distribution.

According to additional aspects of the disclosure, the membrane capsule further comprises a mixing chamber near the inlet to facilitate even fluid distribution.

According to additional aspects of the disclosure, the membrane capsule further comprises a reservoir to collect fluid forming a pool near the outlet and drains allowing fluid to exit the membrane capsule.

According to additional aspects of the disclosure, the membrane capsule further comprises inert filler within the tubes or external to tubes but within the outer shell.

According to additional aspects of the disclosure, the membrane capsule further comprises removable or permanently affixed end caps located at an upper end of each tube.

According to additional aspects of the disclosure, the end caps can be female threaded onto the male cartridge body.

According to additional aspects of the disclosure, the end caps can be attached as removable flange-to-flange connector.

According to additional aspects of the disclosure, the removable end caps and/or permanently affixed end caps can have multiple ports of different sizes and each port can have an industry standard method of connection.

According to additional aspects of the disclosure, further comprising ports or other means of support for instrumentation of the device, such as flow sensors, pressure sensors, or breakthrough capacity instrumentation.

According to additional aspects of the disclosure, the membrane capsule further comprises conical or tapered portions located at a lower end of each tube.

According to additional aspects of the disclosure, the tubes are preferably symmetrically arranged within the cassette.

According to additional aspects of the disclosure, the membrane capsule further comprises receiving apertures in the upper and lower surfaces of the cassette which receive the tubes.

According to additional aspects of the disclosure, at least some of the holes or slots have varying dimensional properties. The dimensional properties may include size, shape, and proximity to other holes or slots.

According to additional aspects of the disclosure, the cassette is housed inside of a capsule having an outer shell, an upper housing member, and a lower housing member. The capsule may optionally include handles.

According to additional aspects of the disclosure, the cassette can be removable with respect to the capsule.

According to additional aspects of the disclosure, the cassette can be permanently affixed within the capsule.

According to additional aspects of the disclosure, the membrane capsule is preferably cylindrical.

According to other aspects of the disclosure, a method of separation comprises flowing a fluid through the inlet of the membrane capsule according to any of the membrane capsules described above, allowing fluid to permeate through the holes or slots of the tubes, and separating a biological substance or non-biological substance.

According to additional aspects of the disclosure, separating the biological or chemical components is accomplished via an ionic-based separation.

According to additional aspects of the disclosure, separating the biological or chemical components is accomplished via a hydrophilic-based separation.

According to additional aspects of the disclosure, separating the biological or chemical components is accomplished via a hydrophobic-based separation.

According to additional aspects of the disclosure, separating the biological or chemical components is accomplished via an affinity-based separation.

According to additional aspects of the disclosure, separating the biological or chemical components is accomplished via a sized-based separation.

According to additional aspects of the disclosure, separating the biological or chemical components is accomplished via a mixed mode separation.

According to additional aspects of the disclosure, the method can comprise mixing, blending, or agitating the fluid in a chamber or manifold before allowing the fluid to permeate through the holes or slots of the tubes.

According to additional aspects of the disclosure, the method can comprise metering fluid with the tubes to ensure there is good mixing or agitating in the chamber or manifold and even and uniform distribution of the fluid throughout an adsorptive membrane.

According to additional aspects of the disclosure, the method can comprise collecting the fluid within a reservoir after allowing the fluid to permeate through the holes or slots of the tubes and draining fluid from the reservoir.

According to additional aspects of the disclosure, the method can comprise reversing the direction of fluid flow within the membrane capsule. For example, fluid may flow from the inside of the tubes outward towards the outer shell or "in reverse" from the outer shell inward towards the inside of the tubes.

According to other aspects of the disclosure, multiple capsules may be operated in parallel or in series as an array that may or may perform simultaneous or unique purification steps.

These or other objectives, features, and advantages of the present disclosure will be apparent from the following detailed description of the illustrated embodiments, accompanied by the attached drawings wherein identical reference numerals will be used for like parts in the various views. The present invention is not limited to or by these objectives, features and advantages. No single embodiment need provide each and every objective, feature, or advantage.

Figure 1:
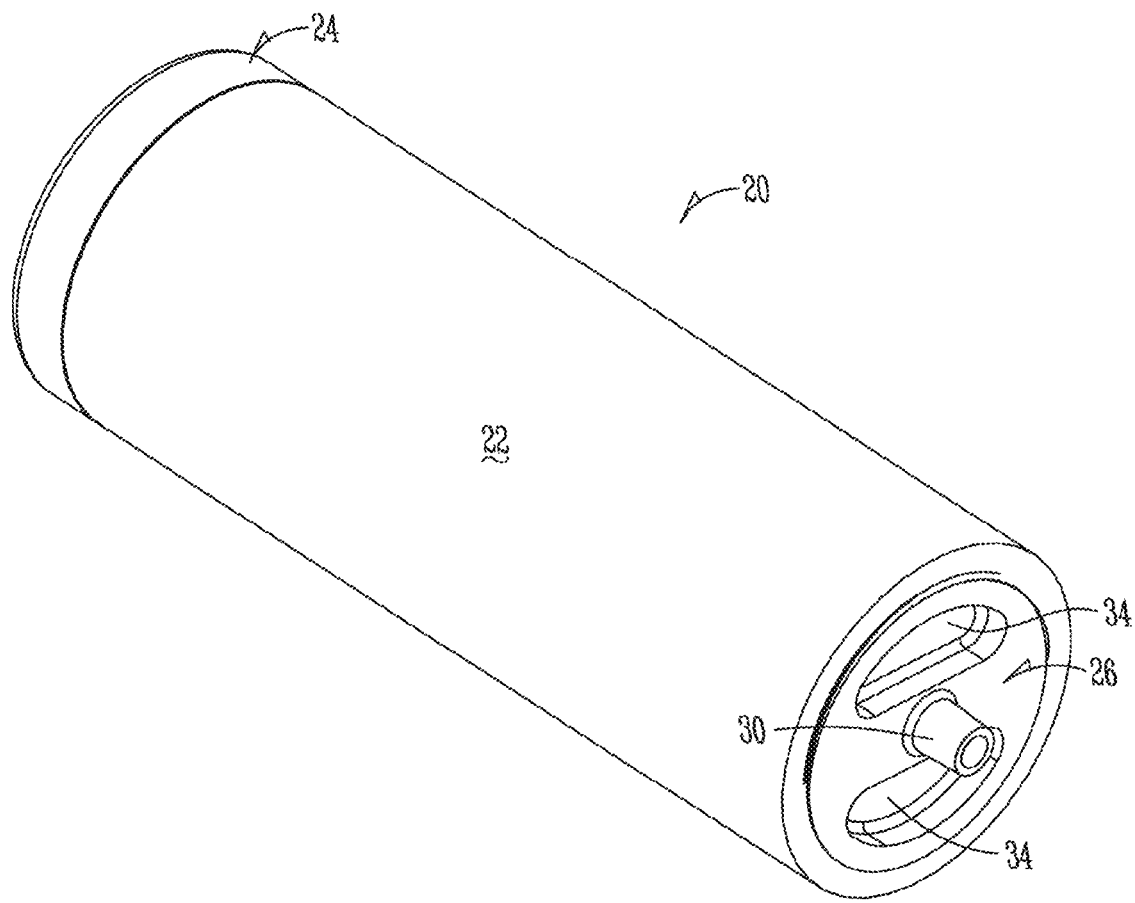
FIG. 1 shows a lower end perspective view of a capsule which houses an array of membrane cartridges for biological and chemical separations, according to some aspects of the disclosure.

Various embodiments of the present disclosure will be described in detail with reference to the drawings, wherein like reference numerals represent like parts throughout the several views. Reference to various embodiments does not limit the scope of the disclosure. Figures represented herein are not limitations to the various embodiments according to the disclosure and are presented for exemplary illustration of the disclosure.

DETAILED DESCRIPTION OF THE PREFERRED EMBODIMENTS

The following definitions and introductory matters are provided to facilitate an understanding of the present invention.

Numeric ranges recited within the specification are inclusive of the numbers defining the range and include each integer within the defined range. Throughout this disclosure, various numeric descriptors are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 2.75, 3.8, 1½, and 4¾ This applies regardless of the breadth of the range The singular terms "a," "an," and "the" include plural referents unless context clearly indicates otherwise. Similarly, the word "or" is intended to include "and" unless the context clearly indicate otherwise. The word "or" means any one member of a particular list and also includes any combination of members of that list. Further, all units, prefixes, and symbols may be denoted in its SI accepted form.

The term "about," as used herein, refers to variation in the numerical quantity that can occur, for example, through typical measuring techniques and equipment, with respect to any quantifiable variable, including, but not limited to, mass, volume, time, distance, pH, speed, temperature, voltage, and current. Further, given solid and liquid handling procedures used in the real world, there is certain inadvertent error and variation that is likely through differences in the manufacture, source, or purity of the ingredients used to make the compositions or carry out the methods and the like. Whether or not modified by the term "about", the claims include equivalents to the quantities.

The terms "invention" or "present invention" as used herein are intended to be non-limiting and are not intended to refer to any single embodiment of the particular invention but encompass all possible embodiments as described in the specification and the claims.

Reference is made to the accompanying drawings which form a part hereof, and in which is shown by way of illustration specific embodiments in which the invention may be practiced. These embodiments of the invention will be described in detail with reference to the drawings, wherein like reference numerals represent like parts throughout the several views. These embodiments are described in sufficient detail to enable those skilled in the art to practice the invention and it is to be understood that other embodiments may be utilized. Mechanical, procedural, and other changes may be made without departing from the spirit and scope of the invention. The following detailed description is, therefore, not to be taken in a limiting sense, and the scope of the invention is defined only by the appended claims, along with the full scope of equivalents to which such claims are entitled.

As used herein, terminology such as first, second, vertical, horizontal, top, bottom, upper, lower, front, rear, end, sides, concave, convex, and the like, are referenced according to the views presented. It should be understood, however, that these terms are used only for purposes of description and are not intended to be used as limitations. Accordingly, orientation of an object or a combination of objects may change without departing from the scope of the invention.

For purposes of the present disclosure, the term "permeance" as used herein refers to the flux of fluid passing through the nanofiber felt per unit thickness of the felt, per unit pressure drop. Permeance is considered to be "high" if it is above 500 L/(min m2 105 Pa).

The term "flux" refers to the flow rate of fluid passing through the nanofiber felt per unit time, per unit of facial area exposed to the flow.

The term "capacity" as used herein refers to the amount of product bound per unit of adsorbent. Capacity for protein adsorption is considered to be "high" if it is above 100 mg of protein/g adsorbent.

The terms "membrane," "felt," and "mat" as used herein are interchangeable and refer to a non-woven or randomly overlaid collection of fibers.

The term "nanofiber felt" as used herein refers to a collection of nanofibers in a substantially planar array, which may also include microfibers added for strength, enhancing flux, etc.

The term "microfibers" as used herein refers to fibers with diameters larger than 1.0 micrometer, and generally between 1.0 micrometer and 1.0 millimeter.

The term "nanofibers" as used herein refers to fibers with diameters smaller than of 1.0 micrometer, and generally between 10 nanometers and 1.0 micrometer, such as between 200 nm and 600 nm.

The term "hybrid nanofiber felt" as used herein refers to a non-woven or randomly overlaid collection of fibers consisting of at least two types of polymers in a combination of single component fibers or composite fibers with either at least one other single component fiber or at least one other composite fiber.

The term "single component nanofibers" as used herein refers to nanofibers produced from a single polymer.

The term "single component nanofiber felt" as used herein refers to the accumulation of many single component nanofibers into a non-woven or randomly overlaid collection of fibers.

The term "composite nanofibers" as used herein are nanofibers produced from at least two different polymers.

The term "moderately elevated temperatures" as used herein refers to temperatures between 24 and 110° C.

The term "differentially removable" as used herein that, when the hybrid nanofiber felt consists of at least two non-cellulose-based polymers, conditions can be selected (elevated temperature or solvent exposure) to remove one of the non-cellulose-based polymers to a greater degree (at least 10% different, and up to 100% vs. 0%) than the other non-cellulose-based polymer.

The term "solvent" as used herein refers to any single component liquid or mixture of liquids capable of dissolving one or more components of the nanofiber felt.

The term "spin dope" as used herein refers to the polymer solution that is used in the electrospinning process.

The term "electrospinning" as used herein refers to the application of electric forces to the spin dope to form the nanofibers.

The term "thermally stable" as used herein means that the polymer does not disintegrate in the temperature range from 50-110° C.

The term "chemically stable" as used herein means that the polymer is not soluble in solvents such as water or common organic solvents (e.g., alcohols and hydrocarbons), and their mixtures.

Figure 2:
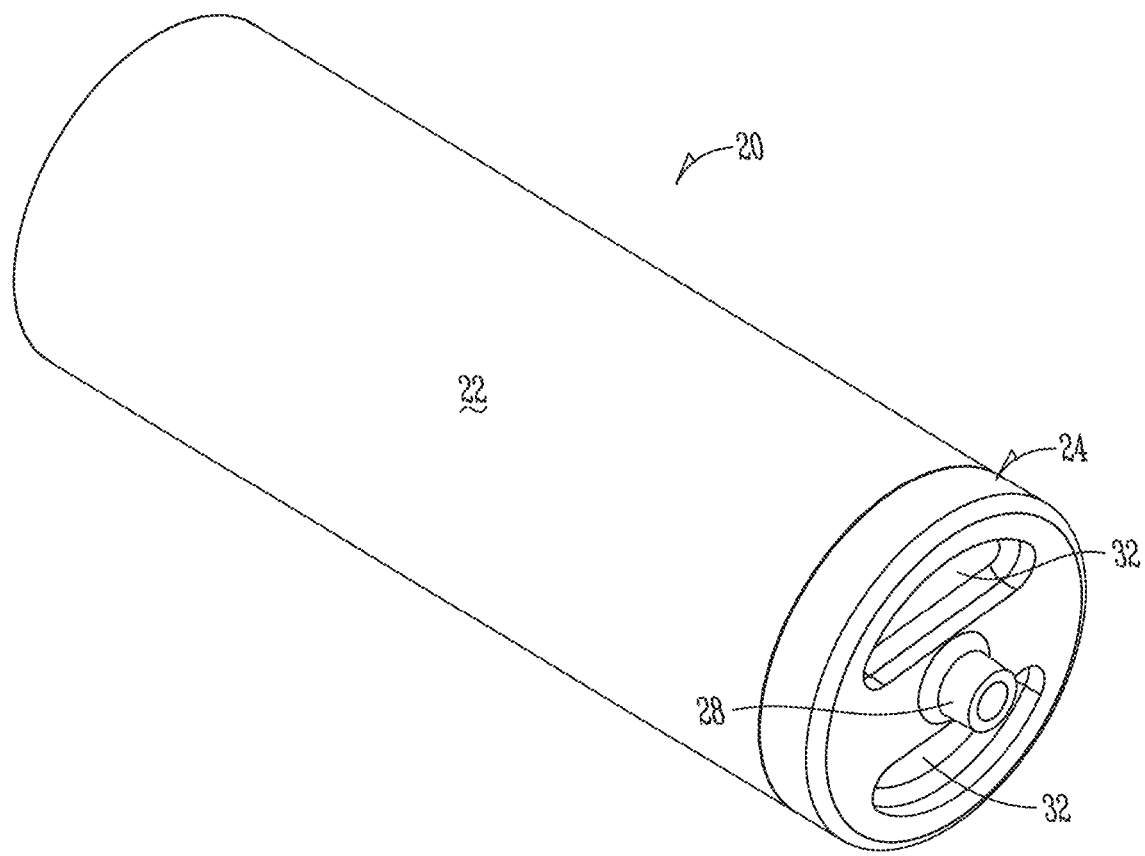
FIG. 2 shows an upper end perspective view of a capsule which houses an array of membrane cartridges for biological and chemical separations, according to some aspects of the disclosure.
Figure 6:
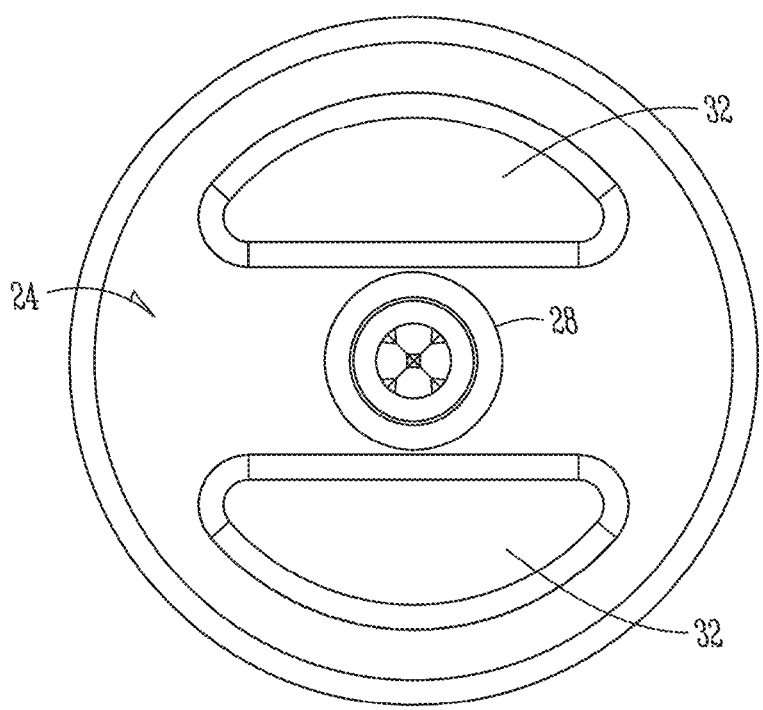
FIG. 6 shows an upper end elevation view of the capsule of FIG. 1, according to some aspects of the disclosure.
Figure 7:
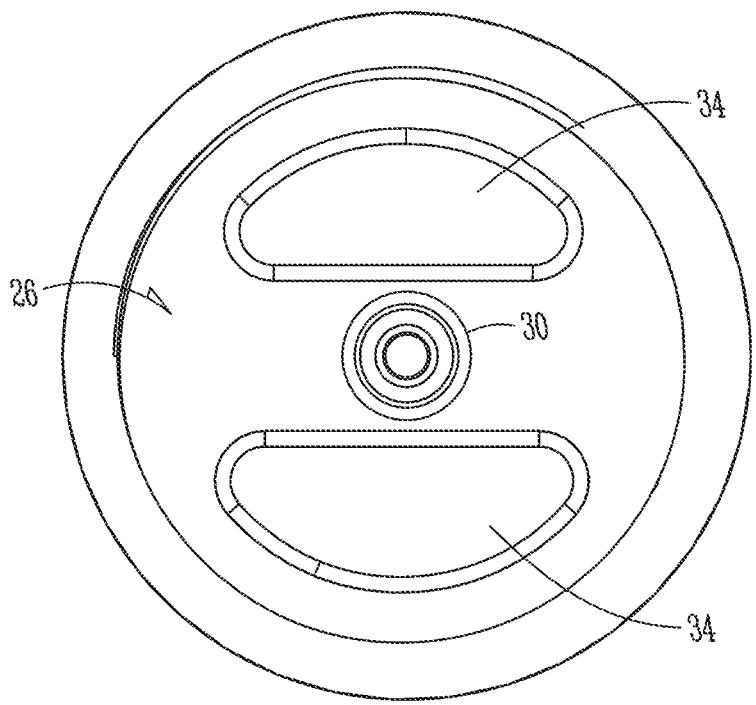
FIG. 7 shows a lower end elevation view of the capsule of FIG. 1, according to some aspects of the disclosure.

Referring now to the figures. FIGS. 1 and 2 show end perspective views of a capsule 20 which houses an array of membrane cartridges or cassette 46 (as shown particularly in FIGS. 3 and 5) for biological and chemical separations. The capsule 20 is typically cylindrical in nature and protects the array of membrane cartridges or cassette 46 via an outer shell 22, an upper housing member 24, and a lower housing member 26. As is shown, the upper and lower housing members 24, 26 threadably attach to the outer shell 22 and generally match the shape of the outer shell 22. A front elevation (identical or mirrored in appearance to the rear and side elevation views of the capsule is shown in FIG. 4 and upper and lower end views are shown in FIGS. 6 and 7.

The upper housing member 24 protrudes from an upper end of the capsule 20 and includes an inlet or entry port 28 and upper handles 32. The lower housing member 26 is recessed within from a lower end of the capsule 20 and includes an output or basin port 30 and lower handles 34. The inlet or entry port 28 delivers fluid to the array of membrane cartridges or cassette 46 of the capsule 20 during operation (e.g., separation) and the outlet or basin port 32 exhausts fluid from the array of membrane cartridges 46 of the capsule 20 during operation. The inlet and outlet 28, 30 protrude from their respective housing members 24, 26 and are sized such that they can simultaneously withstand fluid pressure forces exerted during operation of the capsule 20 and deliver/exhaust enough fluid from the array of membrane cartridges or cassette 46 sufficient for proper biological and chemical separations. The upper and lower handles 32, 34 aid transporting the capsule 20 and aid installing, removing, or replacing arrays of membrane cartridges or cassettes 46 from the capsule 20.

The present disclosure is not limited to the capsule configuration shown in FIGS. 1 and 2. For example, the upper housing member 24 and lower housing member 26 do not have to threadably attach to the outer shell 22 but may instead attach via form melting, friction fit, screws or nuts and bolts, a locking mechanism, or any other known fastening means. The upper housing member 24 may be located within a recession in the capsule 20 and the lower housing member 26 may protrude from at the lower end of the capsule 20. The inlet or entry port 28 illustrated in the figures may be located at the lower end of the capsule 20 or may be configured such that it may, at times, act as an outlet during separation. Likewise, the outlet or basin port 30 illustrated in the figures may be located at the upper end of the capsule 20 or may be configured such that it may, at times, act as an inlet during separation, e.g., a reversal of flow could occur during operation of the capsule 20. The capsule 20 does not have to be a cylinder. For example, the capsule 20 may be an ellipsoid, a polygonal prism, a cone, any other known three-dimensional shape, or a combination of any of the preceding three-dimensional shapes. The capsule 20 does not require handles 32, 34 nor do the upper and lower housing members 24, 26 need to match the shape of the outer shell 22. If, for example, the outer shell 22 was cylindrical, the upper and lower housing members 24, 26 could be hexagonal in nature so that they could be more easily gripped by a hand, tool, or machine to more easily handle the capsule 20, thereby eliminating the need for handles 32, 34.

Figure 3:
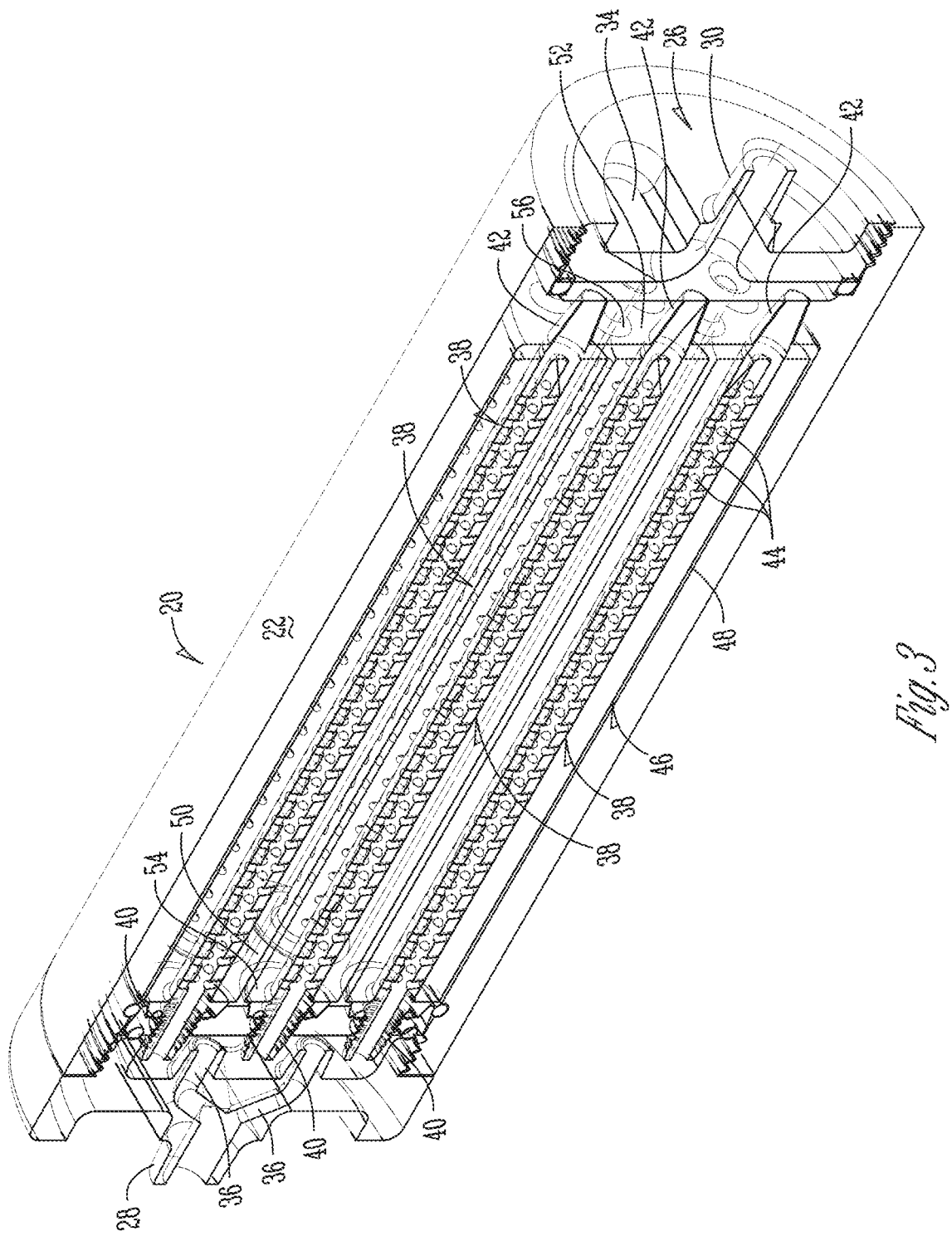
FIG. 3 shows a perspective plan view of the capsule of FIG. 1 such that the array of membrane cartridges for biological and chemical separations can be seen, according to some aspects of the disclosure.
Figure 4:
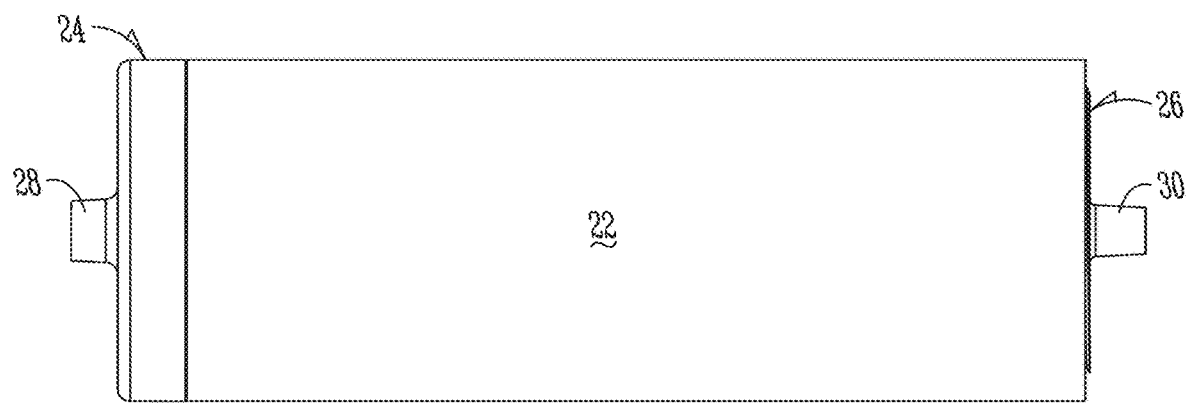
FIG. 4 shows a front elevation view of the capsule of FIG. 1, according to some aspects of the disclosure. The rear elevation, left-side elevation, and right-side elevation views are identical (or mirror) images to the front elevation view.
Figure 5:
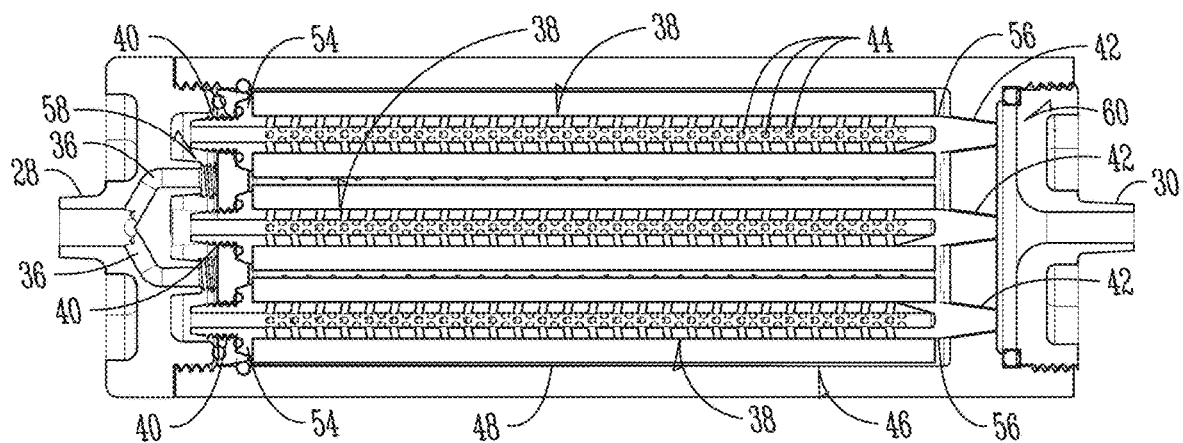
FIG. 5 shows a front plan view of the capsule of FIG. 4, according to some aspects of the disclosure. The rear plan, left-side plan, and right-side plan views are identical (or mirror) images to the front elevation view.
Figure 8:
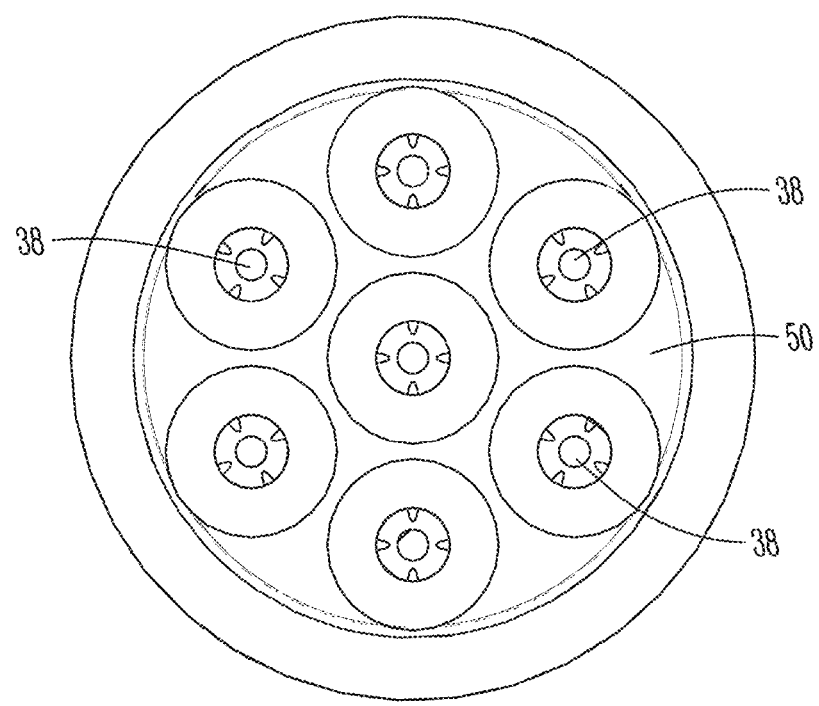
FIG. 8 shows a plan view looking towards the upper end of the capsule of FIG. 1, according to some aspects of the disclosure.
Figure 9:
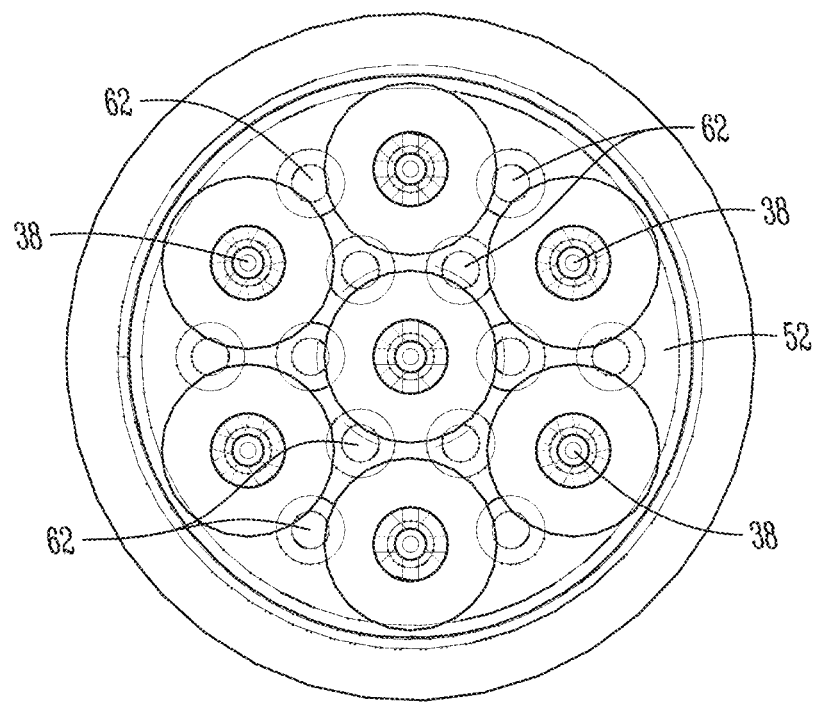
FIG. 9 shows a plan view looking towards the lower end of the capsule of FIG. 1, according to some aspects of the disclosure.

FIGS. 3, 5, 8, and 9 shows section views of the capsule 20 with an array of membrane cartridges or cassette 46 positioned within the capsule 20, such that the internal components of the array of membrane cartridges or cassette 46 are clearly visible. The array of membrane cartridges or cassette 46 is essentially a sub-assembly or sub-system of the capsule 20 and may be removably slid into or permanently attached to the outer shell 22 of the capsule 20 and held in place by the upper housing member 24 and the lower housing member 26. FIG. 3 shows a perspective section view: FIG. 5 shows a front section view; and FIGS. 8 and 9 show end section views (e.g., looking from the lower end of the array of membrane cartridges or cassette 46 towards the upper end of the array of membrane cartridges or cassette 46 or looking from the upper end of the array of membrane cartridges or cassettes 46 towards the lower end of the array of membrane cartridges or cassette 46). The array of membrane cartridges or cassette 46 typically comprises a sidewall 48, an upper surface 50, and a lower surface 52 and takes a shape similar to shape of the capsule 20. The upper and lower surfaces 50, 52 typically have apertures 54, 56 which accommodate several membrane cartridges 38.

30) During separation, fluids are delivered through the inlet or entry port 28 and may be dispersed via diversions 36 before entering the several membrane cartridges 38 and exiting the capsule via the outlet or basin port 30. Thus, the membrane cartridges 38 are fluidly connected to both the inlet 28 and the outlet 30. The diversions 36 facilitate even flow distribution. A mixing chamber 58, as seen particularly in FIG. 5, may also be included between the diversions 36 and the membrane cartridges 38 to further facilitate even flow distribution. A reservoir 60, as seen particularly in FIG. 5, may collect fluid which forms a pool near the outlet 30. Drains 62, as seen particularly in FIG. 9, help trapped fluid in the reservoir 60 exit the membrane capsule 20.

Any number of tubes may be used within a single capsule in accordance with the present invention, preferably between 1 and 500 tubes, more preferably between 2 and 400 tubes, still more preferably between 3 and 300 tubes, even more preferably between 5 and 200 tubes, most preferably between 7 and 100 tubes. However, in a preferred embodiment, there may be four diversions 36 and seven membrane cartridges 38. The membrane cartridges 38 are preferably symmetrically and radially arranged within the array of membrane cartridges or cassette 46; however, the present invention will still work in the event of an asymmetric arrangement. Furthermore, the membrane cartridges 38 are arranged within the capsule 20 in a lengthwise fashion however it is also contemplated that the tubes could be stacked in order to form a "pancake" like design.

Figure 10:
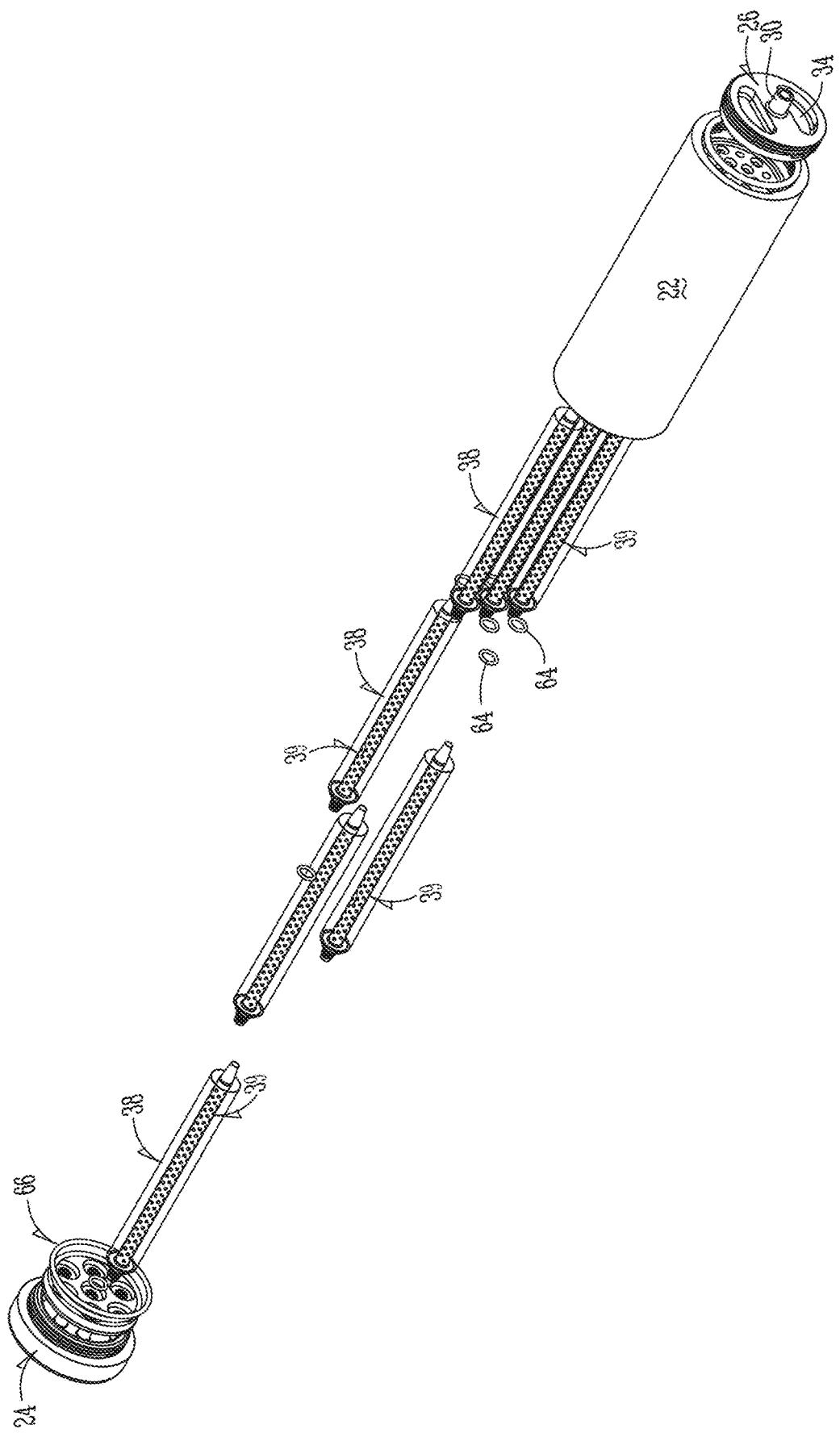
FIG. 10 shows an exploded view of the capsule of FIG. 1, according to some aspects of the disclosure.

The membrane cartridges 38 pass through the first receiving apertures 54 in the upper surface 50 of the array of membrane cartridges or cassette 46 and may attach or secure to upper housing member 24 via end caps 40 located at an upper end of the membrane cartridges 38. The end caps 40 may be removable or permanently affixed to the membrane cartridges 38. For example, the end caps 40 can be female threaded onto the male cartridge body (as is shown in FIG. 3), attached as a removable flange-to-flange connector, can comprise an in-line filter housing having an O-ring 66 and a diffuser (as is shown in FIG. 10), be affixed with adhesive, have multiple ports of different sizes and each port can have an industry standard method of connection, can comprise Luer locks, can comprise ball joints, or can comprise any other means for attaching or securing tubes 39 carrying low pressure fluid. The present disclosure appreciates some of these means for attachment/securement are particularly useful for preventing leakage or contamination. To prevent further leakage or contamination, a physical tube seal, melting, or an adhesive May be used to seal the tubes 39. The ports or other means of support for instrumentation of the device can include flow sensors, pressure sensors, or breakthrough capacity instrumentation.

The tubes 39 also pass through the second receiving apertures 56 in the lower surface 52 of the array of membrane cartridges or cassette 46 and include a conical section 42 at a lower end of the membrane cartridges 38 which may be located completely below the lower surface 52. The membrane cartridges 38 comprise tubes 39 having several holes or slots 44. Preferably, a membrane is wrapped, pleated, and/or spiral wound around the tubes 39. The tubes 39 can be wrapped, pleated, and/or spiral wound with a membrane in a single layer or wrapped, pleated, and/or spiral wound to form multiple layers of membrane around the tubes. Further, the membrane cartridges 38 may contain an inert filler. Choosing what components belong in the tubes is application specific.

For example, microfiber and nanofiber membranes, or "felts", have a variety of different uses for both biological and industrial applications. Microfiber and nanofiber felts can be particularly well suited for purifying biological substances, including, but not limited to, proteins, nucleic acids, carbohydrates, bacteria, viruses, cells, and the like. Microfiber and nanofiber felts are also particularly well suited for purifying non-biological substances, including, but not limited to, metals, metalloids, hydrophobic substances, hydrophilic substances, ionic materials, etc. Microfiber and nanofiber felts are useful in all fluid applications, both liquid and gaseous. Accordingly, the membrane cartridges 38, array of membrane cartridges or cassette 46, and capsule 20 must be sized small enough to accommodate nanofibrous or microfibrous membranes. If these components are too small to be adequately handled by humans, the use of machines will be necessary to manufacture, transport, install, repair, remove, disassemble, and/or clean objects of this scale.

The membrane capsules described herein are not limited by the type of membranes or separation technique. Preferred membranes comprise hybrid felts composed of electrospun nanofibers. Preferred membranes are described in U.S. Pat. No. 9,604,168 and PCT/US17/30078, both of which are fully incorporated herein by reference in their entirety. Hybrid nanofiber felts have a high separation capacity and provide reproducible performance over multiple cycles under both high flow and high pressure. Such nanofiber felts exhibit complex interconnected, three-dimensional porous structures and relatively large surface areas.

Preferred felts comprise more than one polymer type (i.e., they are "hybrid" felts.) This includes hybrid felts made from a combination of single component nanofibers and "composite" nanofibers (e.g., the nanofibers are made from a mixture of two or more materials) into the "hybrid" felt. For the "composite" nanofiber, the "backbone polymer" is a derivatized cellulose, and the first non-cellulosic polymer is capable of being removed from the fiber/felt by exposing it to an elevated temperature or chemical solvents, or both an elevated temperature and chemical solvents. In some embodiments, the removal of the first non-cellulosic polymer simultaneously converts the derivatized cellulose back to cellulose, i.e., the cellulose is "regenerated."

The nanofibers in these felts are preferably manufactured using an electrospinning technique. This refers to the manufacture of fibers based on exposure of an extruded polymer "spin dope" to an electrostatic field which results in elongation of the extruded polymer "jet" into a nanofiber.

Preferred membranes are surface functionalized. Preferably, the surface functionalization is a functionalization on the surface of a fiber, such as a nanofiber or microfiber. Non-limiting examples of functionalization include the addition of ion-exchange groups such as weak or strong acids, and bases (e.g., carboxylic acids and amines), hydrophobic groups such as phenolic compounds, and affinity ligands such as virus conjugates, antibodies, enzyme substrates, and small molecule biomimetics.

For use in bioseparation, the hybrid compositions of the present invention are ideally biologically inert, meaning that they should resist non-specific binding of insoluble solids such as cells and cellular debris, as well as unwanted interactions with proteins, sugars, nucleic acids, viruses, cells and other soluble or insoluble components present in many biologically produced systems.

Preferably, the membranes comprise one or more of the following qualities: (1) small diameter fibers to allow for the largest amount of specific area (this criterion is most important for adsorption processes and less important for strictly size-based separations discussed below): (2) well-controlled and narrow pore size distribution between fibers to allow for even flow distribution during adsorptive applications and for a tight size cutoff for size-based separations: (3) fibers should have excellent mechanical and chemical stability to withstand potentially high operating pressures and harsh cleaning conditions; and (4) fibers should have a well-defined and spatially consistent size and chemical composition.

For adsorption processes, where macromolecular products such as proteins, nucleic acids, and viruses are the predominant targets, it is preferable for the nanofiber felts to have large specific surface areas to provide a plurality of potential binding sites for adsorptive bioseparations. Preferred membranes comprise nanofibers surface functionalized to contain a plurality of binding sites such that adsorption can occur on the surface of the fibers, which makes the binding sites immediately available without requiring the target molecule to diffuse internally. Internal diffusion can often limit the capacity for many adsorption processes of bioproducts when using traditional porous resin beads because of the relatively large size of the target molecules. In addition, because some nanofiber membranes are made from many different polymer and cellulose-based nanofibers, an adsorption ligand can be tailored to meet the needs of a particular separation (e.g., ionic, hydrophobic, and affinity). In some cases, the ligand is incorporated into the nanofiber from the source materials during electrospinning, or alternatively the surface is chemically modified to provide the desired adsorbing agent after producing the nanofiber.

Preferably, the membrane surface is modified to provide ion-exchange and hydrophobic interaction chemistry. Simple chemical modification such as sulfonation of polystyrene fibers with sulfuric acid can be used to produce a cation exchange medium. Grafting, atom transfer radical polymerization (ATRP), and plasma treatments can be used to create ion-exchange surface functional groups as well as three-dimensional tethers from a variety of polymeric substrates including polypropylene, polyvinylidene difluoride, polysulphone, and others. Phenyl and butyl groups can also be introduced as hydrophobic interaction ligands. It may be desirable to further modify the surface of polymer membranes to increase the hydrophilicity and to discourage non-specific binding. This has been accomplished by introduction of poly(ethylene glycol) and other polyols onto the surface.

The ion exchange capacity of a hybrid membrane can also be enhanced by introducing, including for example, but not limited to, diethylaminoethyl (DEAE) groups as a weak anion exchange ligand or carboxylic acid as a weak cation exchange ligand.

In one embodiment, the membrane comprises a polyacrylonitrile (PAN) nanofiber. Fibrous membranes of PAN are preferable for filtration due to thermal stability, high mechanical properties, and chemical resistivity. Electrospun PAN nanofiber felts have been of particular interest due to properties such as small fiber diameters and the concomitant large specific surface areas, as well as capabilities to control pore sizes among nanofibers and to incorporate antimicrobial agents at nanoscale. Felts comprised of nanofibers with antimicrobial functionality have attracted growing attentions due to the concerns about qualities of purified water and/or filtered air as well as the processing costs. Water and air filters (particularly those operating in the dark and damp conditions) are constantly subject to attacks from environmental microorganisms. The microorganisms (such as bacteria) that can be readily captured by the filters grow rapidly, resulting in the formation of biofilms. Consequently, the buildups of microorganisms on the filter surfaces deteriorate the qualities of purified water and/or filtered air: additionally, they also have the unfavorable effects on the flow of water and/or air.

Moreover, the contaminated filters with biofilms are difficult to clean. Usually, high pressure is required during the operation. This in turn increases the costs. Reported methods incorporate antimicrobial agents (such as N-halamine and silver ions/nanoparticles) directly into spin dopes, thus the molecules/particles of antimicrobial agents are distributed throughout the nanofibers (Xinbo Sun, Lifeng Zhang, Zhengbing Cao, Ying Deng, Li Liu, Hao Fong, and Yuyu Sun. "Electrospun Composite Nanofiber Fabrics Containing Uniformly Dispersed Antimicrobial Agents as an Innovative Type of Polymeric Materials with Superior Anti-Infective Efficacy". ACS Applied Materials and Interfaces, 2 (4), 952-956, 2010.)

However, this often leads to process problems, primarily because the high content of antimicrobial agents can seriously affect the process of electrospinning and/or deteriorate the properties of the resulting nanofibers. It has been found that a potential solution to these problems is to introduce antimicrobial functionality onto nanofiber surfaces after the nanofibers are produced (Lifeng Zhang, Jie Luo, Todd J. Menkhaus, Hemanthram Varadaraju, Yuyu Sun, and Hao Fong. "Antimicrobial Nano-fibrous Membranes Developed from Electrospun Polyacry lonitrile Nanofibers". Journal of Membrane Science, 369, 499-505, 2011.). Thus, preferred membranes are surface functionalized to introduce antimicrobial functionality onto the nanofiber surfaces after the nanofibers are produced. Preferably, the membranes comprise nitrile (—C≡N) groups, amidoxime (—C(NH2)=NOH) groups, or a combination thereof. The amidoxime groups can coordinate with a wide range of metal ions including silver ions, and the coordinated silver ions can be reduced into silver nanoparticles. Both silver ions and silver nanoparticles are antimicrobial agents with high antimicrobial efficacy.

In preferred embodiment one or more of the membranes employed in the membrane capsules are selective adsorptive membranes. This style of adsorption utilizes the nanofiber felts as the support for ligands that are used during the selective adsorption process. Selective adsorption involves "active" surface functionalization of the hybrid nanofiber felt, which allows for direct capture (adsorption) of target substances. Such modification is simplified if the hybrid compositions include chemical moieties on their surfaces that are relatively simple to chemically modify to provide adsorption sites. Unlike modifying nanofiber surfaces for ion-exchange and hydrophobic interaction functionality, incorporating affinity ligands onto the nanofiber can be more challenging.

Preferred membranes comprise nanofibers surface functionalized with simple carboxyl groups from grafting methacrylic acid onto the surface can act as the active coupling site by creating a covalent amide bond between the functionalized carboxyl group and an exposed amine group on a protein ligand. Similarly, strong oxidation of cellulose (if controlled properly) can provide aldehyde groups on the fiber surface that can form a covalent attachment to primary amines of a protein (including Protein A and Protein G); especially through the amino acid lysine. In other cases, surface functionalization with a general affinity dye (e.g., Cibacron Blue, capable of binding some proteins) can be coupled directly to a cellulose nanofiber.

More elaborately, bio-active sites for protein ligand immobilization can be incorporated into the nanofiber backbone during nanofelt construction. One example of this is using poly ethylene glycol (PEG) with poly D,L lactide (PDLLA) as a block copolymer. The glycol can be coupled with biocytin (capable of affinity interaction with streptavidin fusion proteins) after electrospinning to create an affinity nanofiber. Similarly, a polycaprolactone (PCL) and poly(D, L-lactic-co-glycolic acid)-b-PEG-NH2 (PLGA-b-PEF-NH2) diblock copolymer can be created containing surface aminated nanofibers for coupling with proteins using a homobifunctional coupling agent. Finally, in some cases it is possible to use intrinsic active sites associated with certain nanofiber matrices. For instance, coupling Concanavalin A (an affinity tag for lectin associated with glycol-proteins and/or other glycolconjugates) to a chitosan-based nanofiber has been successful.

Other techniques for attaching specific ligands to cellulose-based compounds and/or synthetic polymers are known in the chemical arts.

In preferred embodiment one or more of the membranes employed in the membrane capsules comprise a membrane suitable for size-based separations. As an orthogonal purification mechanism to adsorption, sized based separations are also routinely used in downstream bioprocessing. Depth filtration and microfiltration are common operations used for clarification of fermentation broth, where cells (approximately 1~20 μm) and cellular debris (0.1~1 μm) are removed from the bioreactor slurry. Nanofiltration with membranes is utilized for viral clearance and/or purification of 20~200 nm virus particles, and ultrafiltration is commonly employed for concentration and purification of proteins. In all cases several characteristics of the separation medium are desirable. First, a well-defined size cut off is desired to obtain tightly controlled separations. Second, a high porosity material is needed for high throughput processing without excessive pressure requirements to minimize operating time and/or membrane area requirements. And third, chemical and physical robustness is desirable for harsh cleaning conditions and operation under moderate pressures. Nanofiber felts, because they can be produced cheaply in large quantity from mechanically and chemically strong fibers, and with a well-controlled pore size among fibers (or as hollow fibers), offer tremendous opportunity as an advanced size-based separation medium. Polymer nanofibers, in general, show the least amount of non-specific binding, but may suffer from being less chemically robust than carbon and ceramic fibers. Ceramic fibers suffer from being brittle and have the potential for large amounts of nonspecific adsorption of biomass/bio-particles with concomitant fouling, but can withstand harsh regeneration conditions.

To date, nanofiber meshes for size-based separations have primarily seen application for isolation of nanometer and micrometer scale bio-particles (or surrogates) by a depth filtration mechanism. The elevated specific surface area of the nanofibers within a filtration mat provides for a more tortuous path and greater chance to intercept a desired particle from solution while maintaining high porosity. Previously, polymer, carbon, and ceramic nanofibers have all been evaluated and were all able to separate the desired particle size from a mixture while maintaining high fluxes. Ceramic nanofiber meshes have perhaps been used most extensively. One example shows that a combination of large titanate nanofibers with smaller boehmite nanofibers were capable of very high fluxes (1000 L/m2·h) with relatively low pressure driving force (20 kPa) and could remove virtually all particles larger than 60 nm from a solution. It should be noted that many applications of micro and nano depth filtration also rely on chemical adsorption of particles to the surface, which nanofibers are easily capable of and can be manufactured to specifically adsorb a desired impurity.

Preferably, the membranes have a dynamic binding capacity on a volume basis of at least about 60 mg/ml of the membrane, more preferably between about 80 mg/ml and about 300 mg/ml of the membrane.

Preferably, the membranes have a dynamic binding capacity on a mass basis of at least about 120 mg/g of the composition of the membrane, more preferably between about 150 mg/g and about 650) mg/g of the membrane.

Each membrane cartridge 38 has a membrane volume between about 1 mL and about 12 mL, more preferably between about 2 mL and about 10 mL, most preferably between about 3 mL and about 8 mL.

FIG. 10 shows an exploded view of the capsule 20, the array of membrane cartridges or cassette 46, and the membrane cartridges 38. The exploded view is particularly useful for showing washers 64 which are preferably placed between the end caps 40 of the membrane cartridges 38 and the upper housing member 24.

Figure 11:
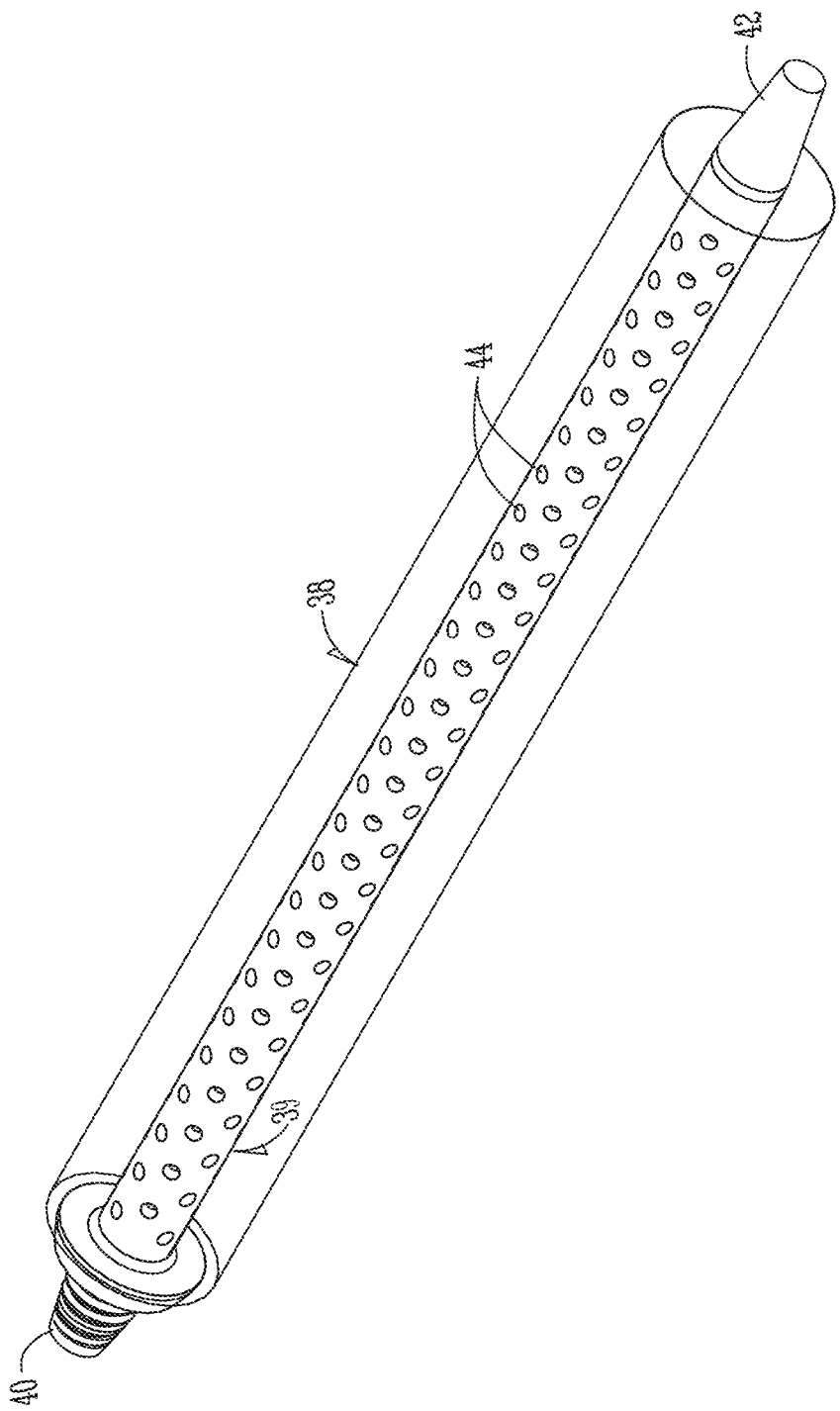
FIG. 11 shows a detailed lower end perspective view of an exemplary tube having holes, according to some aspects of the disclosure.
Figure 12:
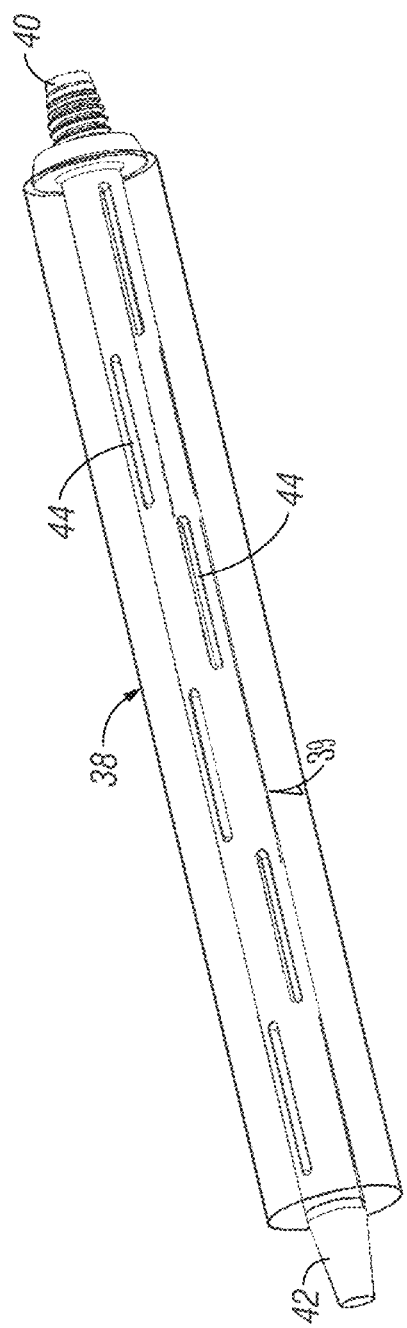
FIG. 12 shows a detailed lower end perspective view of an exemplary tube having small slots, according to some aspects of the disclosure.
Figure 13:
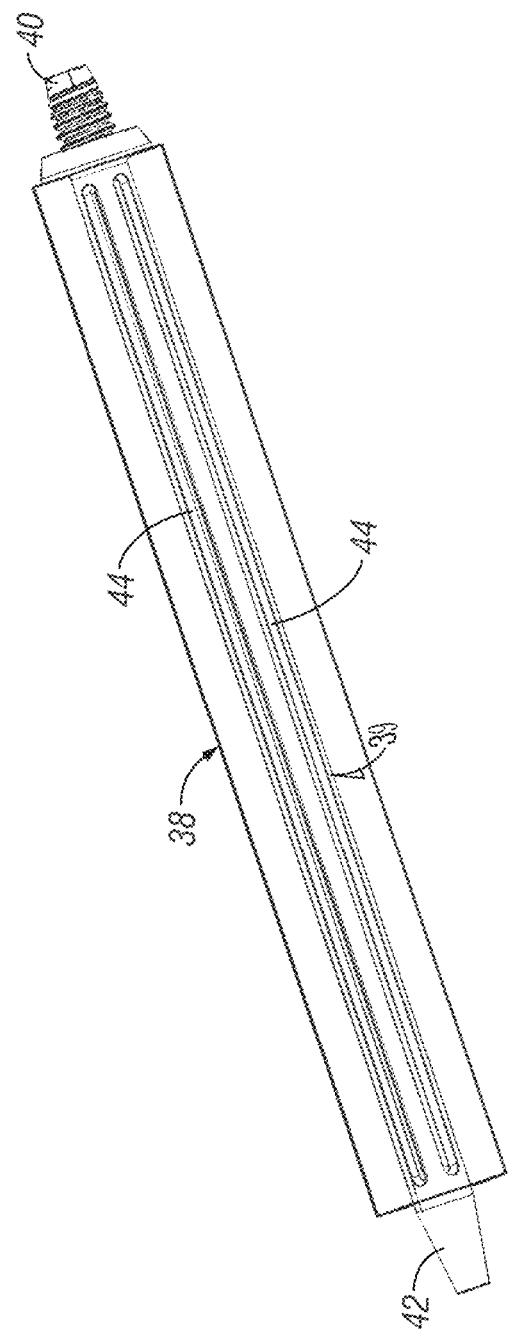
FIG. 13 shows a detailed lower end perspective view of an exemplary tube having large slots, according to some aspects of the disclosure.

Several exemplary embodiments the membrane cartridges 38 are shown in FIGS. 11 to 13. FIG. 11 shows a membrane cartridges 38 having a tube 39 with circular holes 44; FIG. 12 shows a membrane cartridges 38 having a tube 39 with short oval slots 44; and FIG. 13 shows a membrane cartridges 38 having a tube 39 with elongated oval slots 44. However, the present disclosure is not limited these types of holes or slots 44. The holes or slots 44, for example, could be star shaped, polygons (such as rectangles or hexagons), ellipses (such as circles), partial ellipses (such as semicircles), cones, any other known shape, or a combination of any of the preceding shapes. The dimensional properties of the holes or slots 44, including size, shape, and proximity to other holes or slots 44, are integral to separation. Essentially, the holes or slots 44 are effectively used to permeate fluid from the tubes 39, simultaneously diverting and metering some fluid from the fluid flow path between the inlet 28, diversions 36, within the tubes 39 of the membrane cartridges 38, and outlet 30 through the nanofibrous membranes wrapped, pleated, and/or spiral wound around the tubes 39. Alternatively, a mesh column may be utilized instead of a tube 39 with holes or slots 44. The mesh column differs from the tube 39 with holes or slots 44 in that the tube 39 typically takes up more surface area than a mesh (e.g., a cylindrical tube 39 with holes or slots 44 still comprises at least 50% of a cylinder of the same size, while the mesh, for example, does not).

The tubes 39 are also not limited to being cylinders. For example, the tubes 39 may be ellipsoids, polygonal prisms, cones, any other known three-dimensional shapes, or combinations of any of the preceding three-dimensional shapes. Several tubes 39 having different three-dimensional shapes may be employed within a single capsule. Additionally, the three-dimensional shapes do not need to be uniform throughout. For example, a cylinder may be employed which tapers towards the lower end (e.g., the diameter of the cylinder at the upper end is greater than the diameter of the cylinder at the lower end of the tube 39).

The capsule 20, array of membrane cartridges or cassette 46, and tubes 39 may be comprised of plastic, metal, metal alloys, carbon nanofibers, nanocomposite, or any other material which can be manipulated at a nanoscale and microscale level and still have suitable strength to withstand pressure exerted by fluids during separation.

Any number of membrane capsules can be arranged in a system or array. Preferably a system or array comprises between 1 and 100 membrane capsules. In a system or array, the multiple membrane capsules can be arranged in series and/or in parallel. If arranged in parallel, the system or array has the ability to perform a separation on significantly more fluid over a period of time due to the increased volume achieved by use of multiple membrane capsules. If arranged in a series, the system or array has the ability to employ different separation techniques and target different biological or non-biological substances as fluid flows through each membrane capsule. In a preferred embodiment, the system or array of membrane capsules can be arranged so that flow can be redirected from one membrane to another membrane capsule without a break in the significant, or any, break in the flow while a membrane capsule is repaired, replaced, inspected, or otherwise removed from the fluid flow. The arrangement of the membrane capsules in a system or array can be varied to suit the particular arrangement desired. In a preferred embodiment, the membrane capsules are contained in a portable device. Preferably, the portable device is wheeled.

Figure 14:
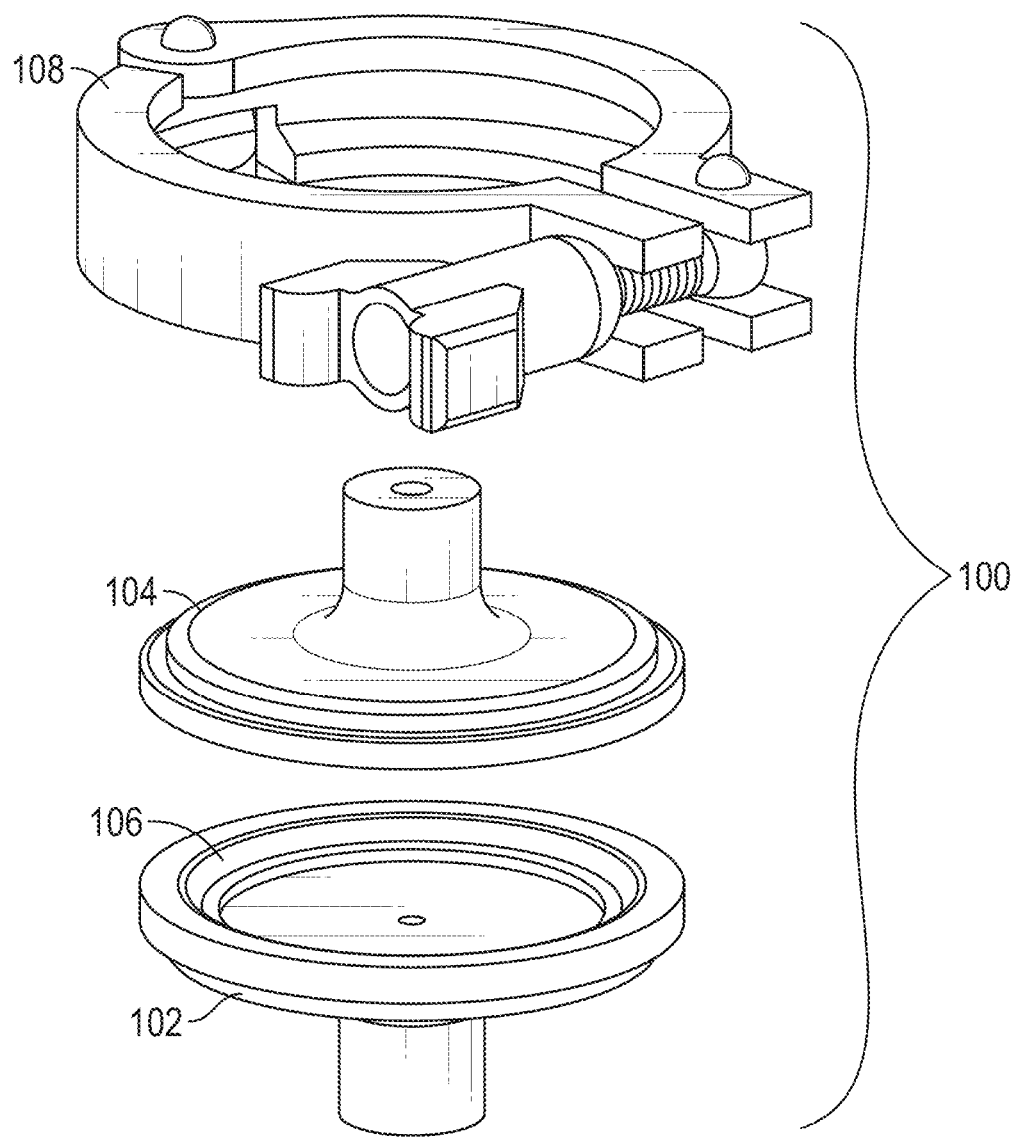
FIG. 14 shows a capsule having less volume than the capsule of the previous figures, according to some aspects of the disclosure.

It is also to be appreciated that for smaller applications, membrane capsule(s) may be specially adapted such that the upper housing member and lower housing member are in much closer proximity to one another and the need for membrane cartridges 38 no longer exists. As shown in FIG. 14, a first small membrane capsule 100 includes an upper housing member 102, a lower housing member 104, an O-ring 106, and an adjustable clamp 108. The upper and lower housing members 102/104 act as an inlet and an outlet for fluid flow: The O-ring 106 provides a seal for any membrane placed within the adjustable clamp 108. The adjustable clamp 108 is shown as an I-bolt scaffold clamp/swivel coupler and, in combination with the upper housing member 102 and lower housing member 104, acts as a housing for the membrane during separation using the small membrane capsule 100. The adjustable clamp 108 allows for easy replacement or replenishment of membranes consumed as a result of using the small membrane capsule 100 for separation.

Figure 15:
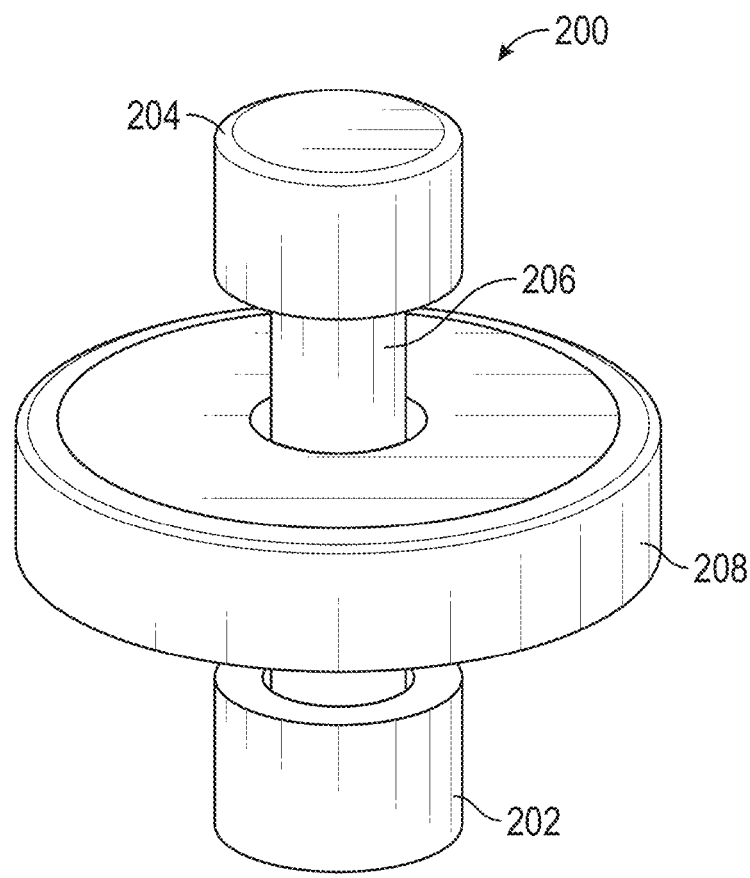
FIG. 15 shows yet another small membrane capsule, according to some aspects of the disclosure.

As shown in FIG. 15, other ways of fastening the upper housing member to the lower housing member are also contemplated by the present disclosure. For example, the second small membrane capsule 200 includes an upper housing member 202 and lower housing member 204 that are fitted to one another or otherwise connecting through an adjoining member 206, said adjoining member 206 penetrating the membrane housing 208. The membrane housing 208 is a substantially "pancake" shaped member. It is preferred that the membrane housing 208 be easily replaced after using the small membrane capsule 200 for separation or allow for the easy replacement or replenishment of membranes consumed as a result of using the small membrane capsule 200 for separation.

The membrane capsules can be used in a variety of separation techniques. Preferably, the membrane capsules are used in methods of separating biological materials and in methods of separating non-biological materials. Preferred separation techniques, include, but are not limited to, affinity-based separations, hydrophilic-based separations, hydrophobic-based separations, ionic-based separations, sized-based separations, mixed mode separations, and the like. In a preferred method, multiple membrane capsules are employed where the different capsules are used to perform different separation techniques. For example, one or more membrane capsules are employed to perform a size-based separation followed by one or more membrane capsules employed to perform an affinity-based separation, followed by one or more membrane capsules to perform an ion-exchange based separation (or multiple ion-exchange based separations).

To perform a separation, generally, fluid (liquid or gaseous) is flowed through a membrane capsule and flows through the membrane capsule as described above such that the fluid passes through the membranes housed in the membrane capsule. Depending on the nature of the separation a target compound (e.g., a protein, a nucleic acid, a carbohydrate, a bacterium, a virus, a cell, a metal, a metalloid, a hydrophobic substance, a hydrophilic substance, an ionic material, and the like) is separated from the fluid (e.g., through size exclusion and/or binding to surface active groups and/or ligands). While the figures show fluid entering the membrane capsules at one end and exiting at another end, it is important to note the present disclosure is not limited to such a configuration, and one of ordinary skill in the art will recognize there are configurations where the inlet and outlet for flow could be arranged in any number of configurations. For example, they can be configured to be on one end, or on side(s) of the membrane capsule or any other suitable location. Such configurations could provide operating simplifications and improve flow.

Preferably the flow rate of the fluid through the membrane capsule is between about 5 MV/min and about 400 MV/min, more preferably between about 10 MV/min and about 300 MV/min. Preferably, the membrane capsule has a volume of between 10 mL and about 10 L, more preferably between about 100 mL and about 5 L, and most preferably between about 200 mL and IL. Typical sizes for "columns" of the membrane capsules are about 0.1, 1.0, 5.0, and 30 mL, however any suitably sized column may be used and/or adapted for specific applications.

Preferably, during a separation method, the fluid flow is performed at a pressure of about 10 bar or less.

Preferably, during a separation method, the residence time is preferably between about 0.1 seconds and about 1 minute. Preferably, the residence time is less than about 1 minute, less than about 55 seconds, less than about 50 seconds, less than about 45 seconds, less than about 40 seconds, less than about 35 seconds, less than about 30 seconds, less than about 25 seconds, less than about 20 seconds, less than about 19 seconds, less than about 18 seconds, less than about 17 seconds, less than about 16 seconds, less than about 15 seconds, less than about 14 seconds, less than about 13 seconds, less than about 12 seconds, less than about 11 seconds, or less than about 10 seconds. Preferably, the residence time is at least about 0.1 seconds, at least about 0.2 seconds, at least about 0.4 seconds, or at least about 0.5 seconds.

Preferably the separation techniques employ fluid flow that is through micro- and macro-pores of the membrane (as opposed to tightly packed resin beads). In a preferred embodiment, the separation comprises adsorption occurring on the surface of the fibers, where no internal diffusion is required. In a preferred embodiment, there is minimal, more preferably no, high-pressure drops with elevated flow rates. This overcomes the difficulties faced with slow intra-particle diffusion required for adsorption within resin beads.

It has been shown that the binding capacity of biomolecules to currently available adsorptive felts is similar in magnitude to resin beads, but can operate at processing flow rates over 10 times faster than packed beds. These factors allow for much faster processing times and potentially higher binding levels for purifying valuable biological products. This is highly desirable, especially for large biomolecules (molecular weights greater than 100 kDa, and/or hydrodynamic diameters of 20-300 nm), because they are difficult to purify using packed beds due to the mass transfer limitations within the small pores of resin beads.

This disclosed membrane capsule design provides a device allowing for adsorptive felts or other membranes to be held in place during separation applications, while further providing efficient flow distribution for high efficiency utilization of all felt/membrane. The device can be used specifically with the elevated flow rates used for preferred separations but can also accommodate lower flow rates as needed. A large volume of felt/membrane can be used within the capsule, minimizing "dead space" where fluid collects: thus making the separation more efficient. The design allows for high resolution and high separation efficiencies, along with yield of recovered products. Furthermore, the design can be easily scaled between different sizes by increasing the number of tubes, increasing the dimensions of the capsules, and increasing the dimensions of the individual tubes. This allows the user to easily complete high throughput, small scale development or characterizations, while also transitioning to larger volumes to achieve similar predictable results.

The use of the structures and separation techniques described herein provide improved consistency across different scales of operation and across different configurations (e.g., mandrel style membrane capsules v. pancake style membrane capsules), including ranges of efficiencies which are unattainable using known structures and techniques for separation. For example, the efficiency of recovering products across different configurations and volumes is preferably, between 85-100%; more preferably, between 90-100%; and most preferably, between 95-100% across 0.1, 1.0, 5.0, and 30 mL columns and when varying the configuration such as pancake to mandrel configurations.

The foregoing description has been presented for purposes of illustration and description and is not intended to be an exhaustive list or to limit the invention to the precise forms disclosed. It is contemplated that other alternative processes and structures obvious to those skilled in the art are to be considered in the invention.

From the foregoing, it can be seen that the present invention accomplishes at least all of the state of objectives.

LIST OF REFERENCE NUMERALS

The following reference numerals are provided to facilitate an understanding and examination of the present disclosure and are not an exhaustive list. Provided it is possible to do so, elements identified by a numeral may be replaced or used in combination with any elements identified by a separate numeral. Additionally, numerals are not limited to the descriptors provided herein and include equivalent structures and other objects possessing the same function.

20 membrane capsule
22 outer shell
24 upper housing member
26 lower housing member
28 inlet/entry port
30 outlet/basin port
32 upper handles
34 lower handles
36 diversions
38 membrane cartridge
39 tubes
40 end caps
42 conical portion
44 holes or slots
46 array of membrane cartridges or cassette
48 cassette sidewall
50 cassette upper surface
52 cassette lower surface
54 first receiving apertures
56 second receiving apertures
58 mixing chamber
60 reservoir
62 drains
64 washers
66 O-ring
100 small membrane capsule
102 upper housing member
104 lower housing member
106 O-ring
108 clamp (e.g., I-bolt scaffold clamp/swivel coupler)
200 alternative small membrane capsule
202 upper housing member
204 lower housing member
206 adjoining member
208 membrane housing member The disclosure is not to be limited to the particular embodiments described herein. The previous detailed description is of a small number of embodiments for implementing the disclosure and is not intended to be limiting in scope. The following claims set forth a number of the embodiments of the disclosure with greater particularity.

What is claimed is:

1. A system for biological and chemical separations, comprising:
    a system inlet and a system outlet fluidly connected;
    an array of membrane cartridges, each of the membrane cartridges comprising:
        an elongated body enclosed within a sealed tubular housing;
        an end cap providing a fluid port to the membrane cartridge within the tubular housing, wherein the membrane cartridge is positioned between the system inlet and the system outlet; wherein the fluid port is fluidly connected to the system inlet; and holes or slots in the elongated body;
    wherein each of the membrane cartridges are arranged in parallel in the array.

2. The system of claim 1, wherein each membrane cartridge comprises a membrane having an inner diameter and an outer diameter, said membrane being (i) permeable and (ii) wrapped, pleated, layered, stacked, and/or spiral wound; and wherein the membrane is within the tubular housing.

3. The system of claim 2, wherein the membrane comprises a surface functionalized membrane; and wherein the surface functionalized membrane comprises an ion exchange group, a hydrophobic group, an affinity ligand, a small molecule biomimetic, or a mixture thereof.

4. The system of claim 1, wherein the end cap is at a first end of the elongated body; and
    a conical or tapered portion at a second end of the elongated body, said second end located opposite the first end.

5. The system of claim 4 wherein the holes or slots are located on an outer surface of the elongated body.

6. The system of claim 5 wherein permeability is permitted by way of holes or slots located along four longitudinal axes symmetrically arrayed about the outer surface.

7. The system of claim 6 wherein said holes or slots comprise four elongated slots that substantially extend from the end cap to the conical portion.

8. The system of claim 6 wherein the holes or slots of opposite axes are mirrored and the holes or slots of adjacent axes are staggered.

9. The system of claim 8, wherein at least some of the holes or slots have varying dimensional properties, said dimensional properties including size, shape, and proximity to other holes or slots.

10. The system of claim 2, wherein the elongated body is a cylindrical tube.

11. The system of claim 2, further comprising inert filler within the elongated body.

12. The system of claim 4, wherein the end cap comprises threads.

13. The system of claim 1, wherein the array of membrane cartridges are symmetrically arranged within a membrane capsule, said membrane capsule has an outer shell, an upper housing member, and a lower housing member.

14. The system of claim 13, wherein the system comprises at least two membrane capsules; and wherein the at least two membrane capsules are configured to perform distinct separation techniques so as to target different biological or non-biological substances as fluid flows through each membrane capsule.

15. The system of claim 14, wherein the at least two membrane capsules are arranged so that one membrane capsule can be removed from flow without disrupting flow through the others.

16. A method of separation employing the system of claim 2, comprising:
   flowing a fluid through the fluid port of the end cap;
   allowing the fluid to permeate through the holes or slots of the elongated body; and
   separating, through biological or chemical means, two substances from one another within the fluid.

17. The method of separation according to claim 16, wherein separating the biological substance and/or non-biological substance is accomplished via a separation selected from the group consisting of: an ionic-based separation, a hydrophilic-based separation, and a hydrophobic-based separation.

18. The method of separation according to claim 16, wherein separating the biological substance and/or non-biological substance is accomplished via an affinity-based separation.

19. The method of separation according to claim 16, wherein separating the biological substance and/or non-biological substance is accomplished via a sized-based separation.

20. The method of separation according to claim 16, wherein separating the biological or chemical components is accomplished via a mixed mode separation.

21. The method of separation according to claim 16, further comprising metering fluid with the elongated body to ensure there is good mixing, blending, or agitating in the chamber or manifold and even and uniform distribution of the fluid throughout an adsorptive membrane.

22. The method of separation according to claim 16, wherein the flowing is occurring at a flow rate of between about 5 MV/min and about 400 MV/min.

23. The method of separation according to claim 16, wherein the membrane has a dynamic binding capacity on a volume basis of at least about 60 mg/ml of the membrane, a mass basis of at least about 120 mg/g of the membrane, a pressure of about 10 bar or less, and the residence time is between about 0.1 seconds and about 1 minute.

24. A method of separation using the system of claim 1, comprising:
   flowing a fluid through the system inlet;
   allowing the fluid to permeate through the holes or slots; and
   separating a biological substance and/or non-biological substance.

* * * * *